Feb. 19, 1952    H. R. DE VLIEG ET AL    2,585,920
IMPELLER TROUGH MILLING MACHINE AND METHOD
Filed Oct. 21, 1948    4 Sheets-Sheet 2
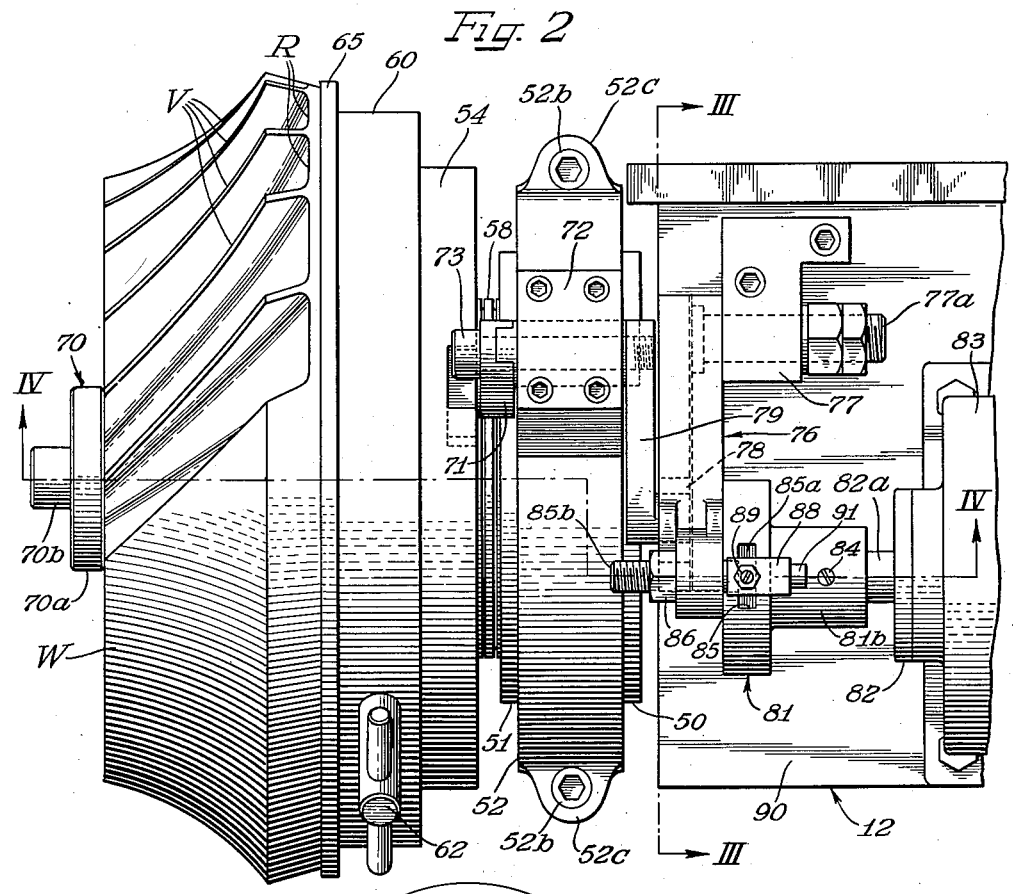
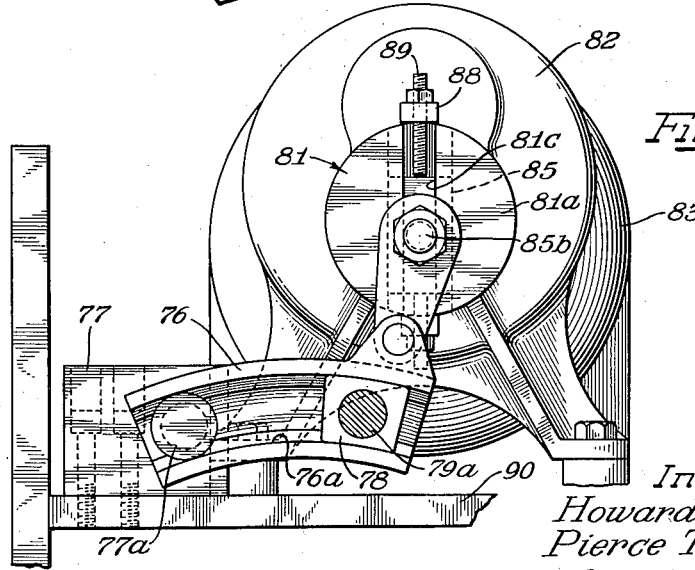
Inventors
Howard R. DeVlieg &
Pierce T. Angell
by The Firm of Charles W. Hills Attys

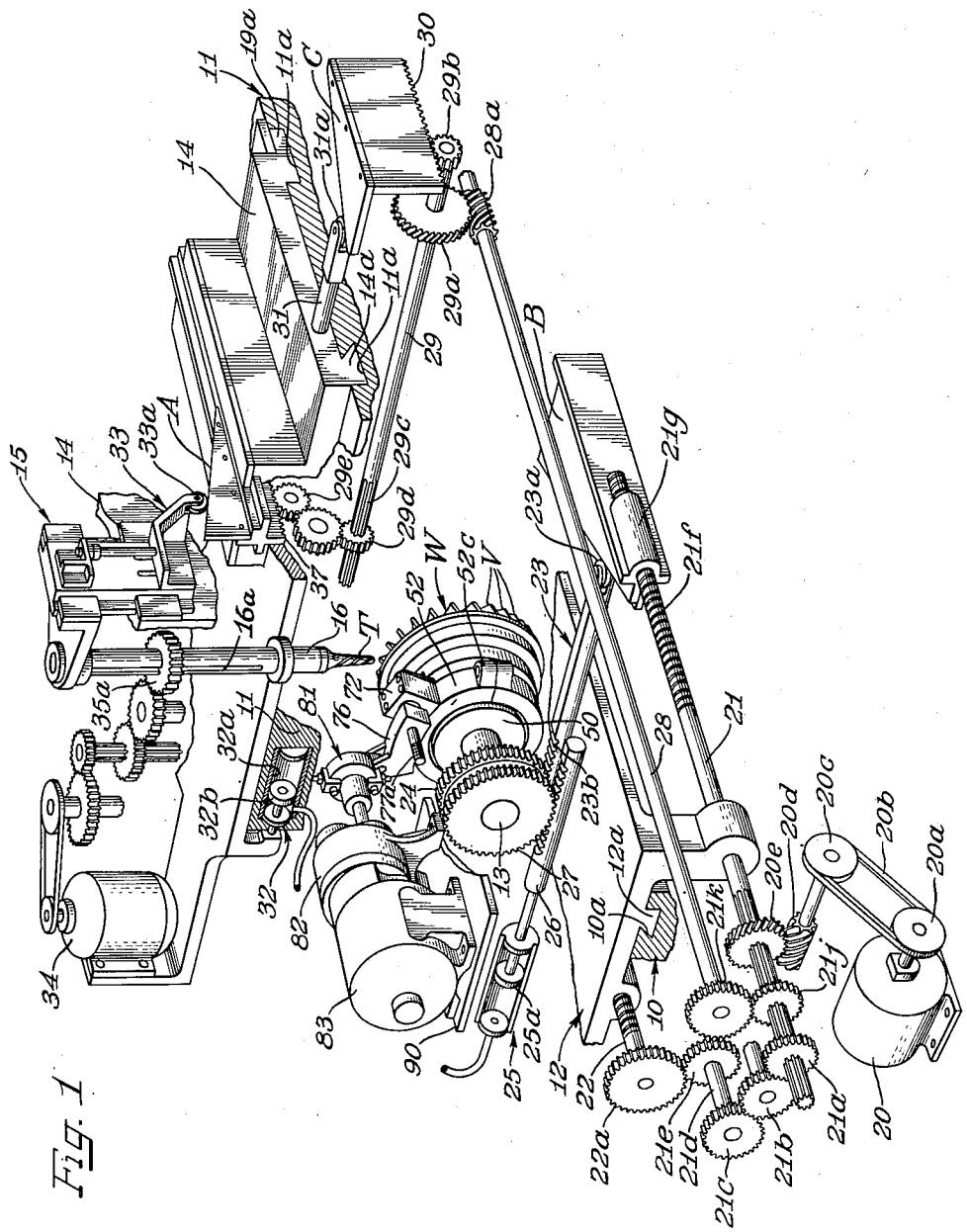

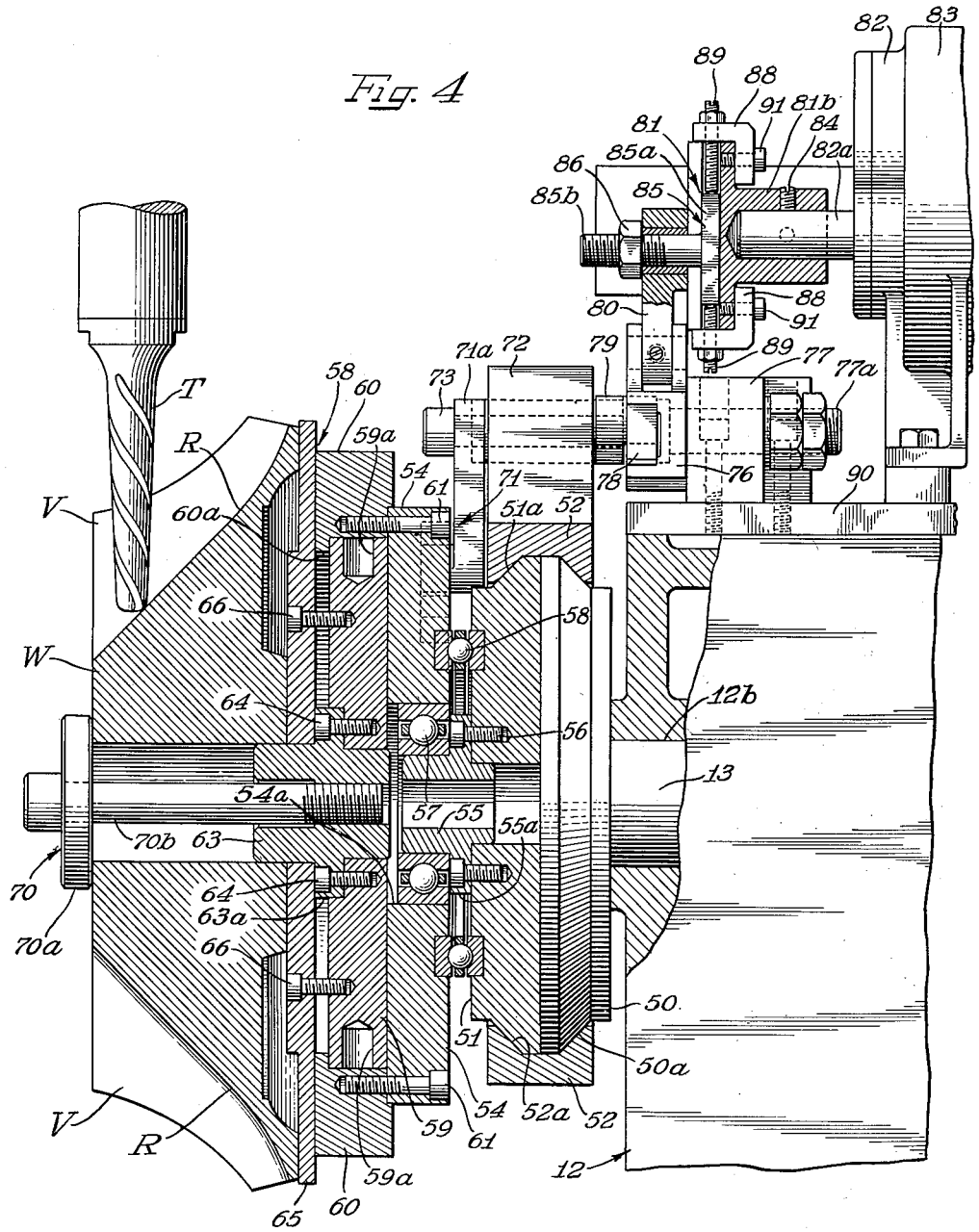

Feb. 19, 1952 — H. R. DE VLIEG ET AL — 2,585,920
IMPELLER TROUGH MILLING MACHINE AND METHOD
Filed Oct. 21, 1948 — 4 Sheets-Sheet 4

Inventors
Howard R. DeVlieg &
Pierce T. Angell
by The Firm of Charlesworth Hills Attys Patented Feb. 19, 1952

2,585,920

UNITED STATES PATENT OFFICE 2,585,920

IMPELLER TROUGH MILLING MACHINE AND METHOD

Howard R. De Vlieg, Grosse Pointe Woods, Mich., and Pierce T. Angell, Cleveland, Ohio, assignors to Thompson Products, Inc., Cleveland, Ohio, a corporation of Ohio Application October 21, 1948, Serial No. 55,798

11 Claims. (Cl. 90—13.9)

This invention relates to a machine tool for generating a complex surface on a workpiece by cutting, milling, grinding, or similar material removing operations, and particularly to a machine for milling in a single operation by a single cutter, a complex surface of a blade or vane of an impeller wheel of the type employed in aircraft compressors or turbines.

More particularly, this invention constitutes an improvement both in method and apparatus of the subject matter disclosed in the pending application of Charles B. De Vlieg, Serial No. 775,109 filed September 19, 1947, and assigned to the assignee of this application. In such pending application there is described and claimed a method and apparatus for forming complex surfaces, such as are required on the vanes or blades of an impeller wheel, by a single operation by a rotating cutter. The machine described in such application will rapidly, yet with a high degree of precision, produce successive circumferentially spaced vane surfaces upon a generally circular workpiece blank. However, after the conclusion of the vane generating milling operations, the hub portion of the impeller wheel lying between any two adjacent vanes will be of irregular contour and only those portions of the hub which lie immediately adjacent to the vane will be of the desired finish contour.

A feature of this invention is the provision of an attachment for a machine tool of the type described in the above identified pending application which will permit such machine tool to automatically effect the generation of the proper hub contour between any two adjacent vanes of an impeller wheel either concurrently with the production of the vanes surfaces or as a separate operation after the milling of the vane surfaces has been accomplished.

Accordingly, it is an object of this invention to provide an improved method and apparatus for generating vane surfaces and intermediate hub portions of impeller type workpieces by an automatic operation involving a single rotating material removing tool.

A further object of this invention is to provide an improved method and apparatus for automatically milling or grinding, in a single operation with a single rotating material removing tool, the root surfaces lying between any two adjacent vanes of an impeller type workpiece.

Still another object of this invention is to provide an improved apparatus for milling the root contour of an impeller wheel of the type wherein the circumferential spacing of adjacent vane elements varies along the axial length of the wheel, characterized by the employment of a single rotating cutting element which is circumferentially oscillated between two adjacent vane surfaces and wherein the arcuate extent of such oscillation is controlled as a function of the axial position of the cutter with respect to the impeller wheel.

Still another object of this invention is to provide an attachment for a machine tool capable of generating complex surfaces upon an impeller wheel which will permit the machine to automatically generate the required root contour between any two adjacent vanes of the impeller wheel workpiece.

Still another object of the invention is to provide a metal working machine capable of producing circumferentially spaced, complex generated surfaces upon a workpiece within limits of precision tolerances and by a single, automatic, metal removing operation, thus permitting the fabrication of such complex surfaces and the root contour therebetween at a higher rate and at less cost than the machines or methods heretofore known have permitted.

The specific nature of the invention, as well as other objects and advantages thereof, will become apparent to those skilled in the art from the following detailed description of the annexed sheets of drawings which, by way of preferred example only, illustrate one specific embodiment of the invention.

On the drawings:

Figure 1 is a schematic perspective view of a milling machine embodying this invention, with parts omitted for clarity, showing all of the moving elements of the machine employed for producing the various co-ordinated relative movements of the rotating cutter and the workpiece;

Figure 2 is a plan view of a milling machine attachment embodying this invention for superimposing an automatically controlled oscillating movement upon the relative movements of the cutter and workpiece normally obtained in the operation of the machine constructed in accordance with Fig. 1;

Figure 3 is a sectional view taken on the plane III—III of Fig. 2;

Figure 4 is a multi-plane, sectional view taken on the planes IV—IV of Fig. 2.

As shown on the drawings:

Figure 5:
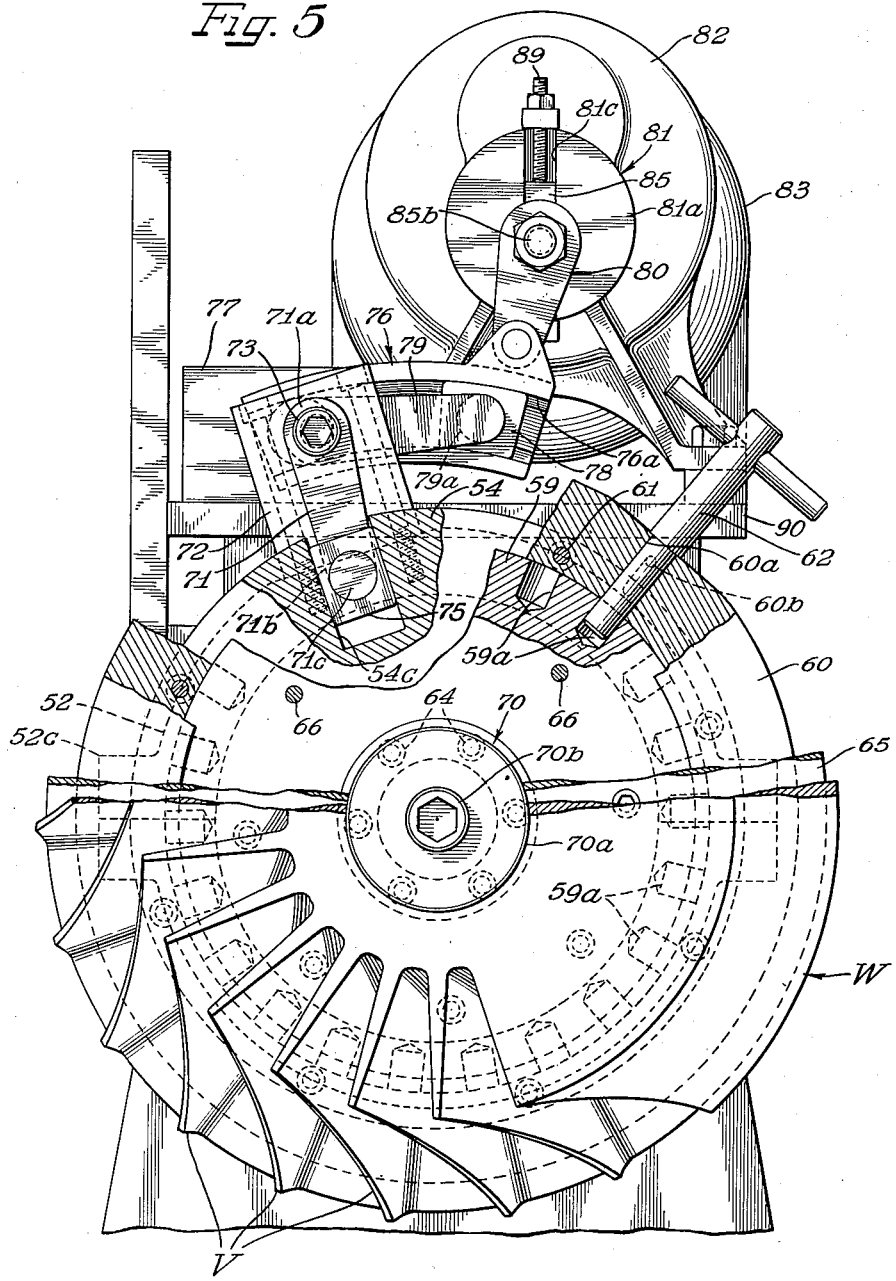
Figure 5 is a front elevational view, with parts broken out in section for clarity, of the milling machine attachment of Fig. 2.

While the method and apparatus to be hereinafter described will refer to milling operations, it is to be understood that the principles of this invention are equally applicable to other forms of material removing elements, such as abrasive or grinding elements and single tooth cutters. Furthermore, while the invention will be particularly described in connection with the milling of the root contour of an impeller wheel, it is to be understood that this constitutes merely a preferred application and the invention is equally applicable to any type of workpiece having circumferentially spaced complex blades or vanes.

As indicated above, this invention constitutes an improvement of the methods and apparatus described in the above identified pending application of Charles B. De Vlieg and hence reference should be had to the disclosure of such pending application for a detailed description of the elements of the machine which are not modified by this invention.

As schematically indicated in Fig. 1, and described in detail in the above identified pending application, the machine embodying this invention may comprise an elongated bed frame 10 upon one end of which is rigidly mounted in any suitable manner a pedestal portion 11. A primary carriage 12 is mounted on the bed frame 10 for movement lengthwise of the bed toward and away from the pedestal 11, as by having a depending gib 12a slidably received in a correspondingly shaped groove 10a in the bed frame 10. A spindle 13 is suitably journaled in carriage 12 for rotation about an axis which is generally parallel to the direction of movement of the carriage 12.

A second carriage 14 is mounted on the pedestal 11 for movement generally transversely of such pedestal, i. e., in a direction substantially perpendicular to the direction of movement of the first carriage 12. Depending gibs 14a cooperate with correspondingly shaped grooves 11a in the pedestal 11 to guide such movements. A sub-carriage 15 is then movably mounted on the second carriage 14 for movements in a vertical plane, which movement is substantially perpendicular to both of the directions of movements of the first and second carriages 12 and 14, respectively. A spindle 16 is suitably journaled in sub-carriage 15 for rotation about a vertical axis, which will be recognized to be an axis which is substantially parallel to the direction of movement of the sub-carriage 15.

It is therefore apparent that a variety of components of relative movements may be produced between the spindles 13 and 16 depending upon the rotative movements imparted to such spindles and the linear movements imparted to the first carriage 12, the second carriage 14 and the sub-carriage 15. Those skilled in the art will also recognize that in any material removing operation, such as milling or grinding, it is immaterial whether the workpiece or the rotating tool is actually moved, so long as the necessary components of relative movement between the workpiece and rotating tool are produced. Therefore, either the spindle 13 or the spindle 16 could be employed to mount either the workpiece or the rotating tool and identical relative movements of the workpiece and rotating tool could be obtained in either case by obvious modifications of the machine.

In the particular example illustrated in the drawings, the spindle 13 is employed to mount a workpiece W which is shown as comprising an impeller wheel blank of the integral vane type. The rotatable spindle 16 is employed to mount a rotating cutting element T which is shown as comprising a side and end cutting, milling cutter of tapered configuration, but may obviously comprise any form of rotatable, material removing tool. When an integral impeller blank workpiece W is to be operated on, it is, of course, necessary to provide some form of indexing mechanism which will effect the successive positioning of the workpiece blank W in a plurality of angularly separated positions with respect to the rotating tool T, so that such tool may successively operate on the circumferentially separated vane surfaces on the workpiece or the troughs or hub portions lying between any two adjacent vane elements. The details of the particular indexing mechanism employed will be described later.

Figure 1 illustrates, in schematic form, the complete mechanism employed for effecting the required co-ordinated relative movements between the workpiece W and the rotating tool T which will cause the rotating tool T to not only generate the required complex contour of the facing surfaces of each adjacent pair of vanes, but will also permit such tool to generate a required root contour therebetween.

Thus a motor 20 is provided which, through pulley 20a, belt 20b, pulley 20c, worm 20d, and worm gear 20e drives a splined shaft 21 to which the worm gear 20e is keyed. The splined shaft in turn drives through idler gears 21a, 21b, and 21c, idler shaft 21d, pinion 21e and gear 22a, a lead screw 22, which is threadably engaged with the first carriage 12 so that rotation of lead screw 22 produces a linear movement of carriage 12 along the bed frame 10. There is thus produced between the workpiece W and the rotating tool T a first relative movement constituting a linear displacement in a direction substantially parallel to the axis of rotation of the workpiece W, hence producing a relative movement component along the axis of rotation of the workpiece W.

The workpiece W is concurrently rotated about the axis of spindle 13 in timed relationship to the lineal movement of carriage 12 by a cam and follower mechanism comprising a contour cam B which is relatively longitudinally movable with respect to the carriage 12 and thereby produces transverse displacement of a cam follower unit 23 which has a roller 23a journaled in one end thereof and engaged with the contour of cam B. The other end of cam follower unit 23 is provided with rack teeth 23b which are engageable with a large gear 24 which is suitably co-rotatably connected to the spindle 13 so as to produce a rotation of such spindle, and as will be hereinafter demonstrated, a rotation of the workpiece W as a function of the contour of cam B.

To eliminate any effects of back lash in this mechanism, a biasing force is applied to the cam and cam follower mechanism by hydraulic unit 25, which has the piston portion 25a thereof secured to a cylindrical rack member 26 which is meshed with a gear 27, also secured to spindle 13. A constant pressure is thereby applied through cylinder unit 25 to maintain at all times tight engagement between gear 24 and rack portion 23b of cam follower 23, as well as to maintain the cam follower 23 in snug engagement with the cam surface of cam B.

It is obvious that the cam B may, if desired, be rigidly mounted on the bed frame 10 and the rotational movement of the workpiece W about the axis of spindle 13 derived from cam B and cam follower 23 by lineal movement of the carriage 12 along the bed frame 10. However, it often happens that the extent of the required lineal movement of the carriage 12 for a particular workpiece W is quite limited, so that to produce the required amount of rotational movement of the workpiece W about the axis of the spindle 13 would require that the cam B have a very steep contour. To improve this condition, the cam B may also be linearly moved with respect to bed frame 10 to permit a reduction of deepness of the contour of cam B. Such lineal movement may be conveniently derived by permitting the splined shaft 21 to move in the carriage 12, and providing a threaded portion 21f on the end thereof to engage with a threaded bracket portion 21g to which cam B is secured, so that the rotation of splined shaft 21 produces the desired relative displacement of cam B with respect to the cam follower unit 23.

There has now been described the mechanism for producing two co-ordinated components of relative movements between the workpiece W and the rotating tool T comprising respectively, a rotation of the workpiece W about a selected axis and a relative lineal displacement of the workpiece W with respect to the tool T in the direction of such selected axis. The two additional co-ordinated components of relative movement may be derived by shifting the position of the spindle 16 which carries the rotating tool T. For this purpose, gears 21j and 21k provide a power take-off on splined shaft 21 to drive a shaft 28 extending along the bed frame 10 to a point within the pedestal portion 11 wherein a worm 28a drives a transversely extending shaft 29 through a worm gear 29a.

A contour cam C is slidably mounted in the pedestal portion 11 for lengthwise movements. The cam C is linearly shifted with respect to pedestal portion 11 in timed relationship to the previously described lineal movement of the workpiece W by a pinion 29b on shaft 29 which engages a rack 30 secured in depending relationship to cam C.

Second carriage 14, which will be remembered as being mounted for transverse movement with respect to pedestal portion 11, has a cam follower unit 31 rigidly secured thereto having a roller 31a journaled in its projecting end which cooperates with the cam surface of cam C. Hence the movement of cam C results in a lateral displacement of second carriage 14, and hence in a third component of relative movement between the workpiece W and the rotating tool T which constitutes a lineal displacement in a direction substantially perpendicular to the axis of rotation of the workpiece W.

To eliminate back lash in this portion of the mechanism, the entire second carriage 14 is urged toward the cam C by a pressure cylinder unit 32, the cylinder portion 32a of which is fixedly mounted on the pedestal 11 and the piston portion 32b is rigidly secured to second carriage 14. Suitable hydraulic or pneumatic pressure is applied to the cylinder unit 32 to maintain a force on such carriage 14 urging the cam follower unit 31 into snug engagement with the cam surface of cam C.

To provide a fourth component of co-ordinated relative movements of the workpiece W and the rotating tool T, the end of horizontal shaft 29 is splined, as indicated at 29c and a pinion 29d is secured to such splined portion. Pinion 29c drives a gear 29e through an idler, and gear 29e cooperates with a rack 37 which is secured in depending relationship to a contour cam A. The cam A is mounted in the second carriage 14 for movement in a direction generally parallel with the direction of the bed frame 10. Sub-carriage 15, which, it will be recalled, is movably mounted on the second carriage 14 for generally vertical movements, is provided with a cam follower bracket 33 having a roller 33a in a projecting end thereof which engages the cam contour of cam A.

Thus a third and fourth component of relative movement between the workpiece W and the rotating tool T are produced which are respectively controlled by the cams A and C. The cam C controls a component of relative movement in a direction substantially perpendicular to the axis of rotation of the workpiece W, while the cam A controls a component of relative movement in a direction aligned with the axis of the spindle 16 which carries the rotating tool T.

In order to effect the rotation of the tool T, a driving motor 34 is mounted on the second carriage 14 and is directly connected through a belt drive and a plurality of gears to a gear 35a which is slidably secured to a splined or keyed portion 16a of the spindle 16. Hence the cutting tool T is rotated independently of the vertical movements of the spindle 16 produced by displacements of the subcarriage 15 under the control of cam A.

It will be obvious to those skilled in the art that the aforedescribed four relative movements between the workpiece W and the rotating tool T will permit the rotating tool T to generate a complex vane surface on the workpiece W. The characteristics of the generated vane surface will, of course, depend upon the particular contour of the cams A, B and C and the selected relationships of the movement of such cams with respect to each other and to the axial movement of the workpiece W produced by the lead screw 22. Obviously, a plurality of such vane surfaces may be generated on the workpiece W by successively angularly indexing the workpiece W with respect to the axis of the spindle 13.

In accordance with this invention, an attachment is provided for the aforedescribed machine elements by which a fifth component of relative movement between the workpiece W and the rotating tool T is produced. Such fifth component constitutes, in effect, a pivotal oscillation of the workpiece W about its own axis which permits the rotating tool T to sweep back and forth circumferentially between any two opposed vane surfaces of the workpiece W and thereby effect the milling of the root contour between any two opposed vane surfaces as well as the generation of such vane surfaces if desired.

As will be recognized by those skilled in the art, it is most practical for large quantity production operations to achieve the milling of the individual vane surfaces independently of the root contour therebetween on one machine, and then to place the impeller blank having the vane surfaces finished, but with the root contour unfinished, upon a machine embodying this invention and thereby finish mill or grind the root contour. In this manner, the amount of metal required for removal by any one cutter in any one operation is maintained at a minimum, and a high production rate, plus longer tool life and a better finish of the vane surfaces may be obtained. However, it should be distinctly understood that the machine embodying this invention may, if desired, be employed to fabricate, in a single operation, both the opposed vane surfaces of any particular pair of adjacent vanes and the root contour therebetween.

To accomplish the superimposed oscillating movement of the workpiece W, it is necessary to modify the mounting of the workpiece W with respect to the primary spindle 13 from the arrangements described in the above identified pending application of Charles B. De Vlieg. Refering particularly to Figs. 2 through 5, it will be seen that the forward end of the primary spindle 13 projects out of the bearing aperture 12b in which it is journaled in the first carriage 12, and has a coupling disk 50 suitably co-rotatably secured thereto. Coupling disk 50 has a generally conically shaped peripheral surface 50a. A correspondingly shaped second coupling disk 51 is provided which likewise has a conically shaped peripheral surface 51a and this disk is clamped in face to face abutting relationship with the primary coupling disk 50 by a surrounding coupling ring or band 52 which has internal conical surfaces 52a shaped to conform to and snugly engage the conical surfaces 50a and 51a on the coupling disks 50 and 51, respectively. The coupling band 52 may be conveniently formed in two half parts which are drawn into snug engagement by bolts 52b which pass through integral projecting ears 52c formed on the coupling band.

The front face of the secondary coupling disk 51 is employed to mount a fixture support 54. A bearing hub element 55 is provided having a central flange 55a which is bolted to the front face of secondary coupling disk 51 by a plurality of bolts 56. An antifriction unit 57 is then mounted on the axially projecting portion of the bearing hub 55 and cooperates with the central bore 54a of the fixture support plate 54 to journal such plate for rotational movement relative to the primary spindle 13. An antifriction thrust bearing unit 58 is mounted between the opposed axial end faces of the secondary coupling disk 51 and the support plate 54.

A work fixture unit 58 is provided having a disk-like indexing plate or disk 59 abutting the front face of the support fixture 54 and journaled for rotative movements with respect to support fixture 54 by a retaining ring 60, which is bolted to the periphery of support fixture 54 by a plurality of bolts 61 and has an inwardly projecting radial flange 60a overlaying a portion of the front face of the indexing disk 59 to retain the same against axial movements. Indexing plate 59 has a plurality of circumferentially spaced, radially extending holes 59a formed in its periphery and such holes selectively receive the cylindrical end of an indexing pin 62 (Figs. 2 and 5) which is radially inserted in a suitable aperture 60a provided in the retaining ring 60. Radial movement of index pin 62 is limited by a transverse pin 60b which cooperates with a slot in index pin 62. In this manner, the indexing plate 59 may be selectively co-rotatably secured to the fixture support 54 in any one of a plurality of angularly spaced positions thereon by selective insertion of the indexing pin 62 into the indexing holes 59a. Obviously, the angular separation of the holes 59a corresponds to the angular separation of the successive vanes V of the impeller wheel workpiece W.

The work fixture 59 further embodies a hollow, internally threaded hub member 63 which is insertable in the central aperture in the indexing plate 59 and secured thereto by a plurality of bolts 64. In addition, a circular base plate 65 rests upon the front face of a radial flange 63a of the hub member 63 and is bolted to the indexing plate 59 by a plurality of bolts 66. An impeller workpiece W may be snugly mounted on the workpiece fixture 58 as by having its central bore slipped over the projecting end portion of the hub member 63 and its axial end face abutting the front end face of the mounting plate 65. The impeller wheel W may be clamped thereto by a bolt-like clamping element 70 having a threaded stem portion 70b engaged in the internal threads of the hub member 63 and an enlarged head portion 70a engaging the outer face of the impeller wheel workpiece W.

From the foregoing description it is apparent that the fixture support 54 is capable of rotational movements with respect to the primary spindle 13 and, in addition, the workpiece W may be selectively angularly indexed with respect to the fixture support 54.

In accordance with this invention, it is desired that the workpiece W not only follow all of the movements of the primary spindle 13 relative to the cutting tool T, but in addition, it is necessary that the workpiece W be oscillated about its own axis so as to effectively traverse the rotating cutting tool T circumferentially between any selected pair of adjacent vanes.

To accomplish the foregoing, a primary lever 71 is provided, having one end thereof pivotally supported about an axis parallel to the axis of the primary spindle 13 but subject to all of the movements of the primary spindle 13 relative to the cutting tool T. Such mounting of the primary lever 71 may be conveniently accomplished by an integral bearing block 72 which is rigidly bolted to the periphery of the clamping ring 52, which will be recalled to be fixedly secured with respect to the primary spindle 13. Thus, the lever 71 has one end portion 71a keyed to a pin 73 which is journaled in the bearing block 72 for pivotal movements about an axis parallel to the axis of the primary spindle 13. The other end 71b of the primary lever 71 is radially slidably engaged with the fixture support 54, as by having a slide block 75 slidably engaged in a radially extending groove 54c (Figure 5) formed in the back face of the fixture support 54 and the end 71b of the lever 71 pivoted to such side block as by a pin 71c.

It is therefore apparent that so long as pivotal movement of the primary lever 71 is prevented, the workpiece W will be driven by the fixture support 54 in exact correlation with the movements of the primary spindle 13, hence the required relative movements between the workpiece W and the rotating tool T for production of a complex vane surface on the workpiece W may be obtained. At the same time, any pivotal movement of the primary lever 71 will superimpose an additional movement of the workpiece W relative to the cutting tool T. Hence an oscillating pivotal movement imparted to the primary lever 71 will superimpose an oscillating rotational movement of the workpiece W with respect to the cutting tool T, and will have the effect of traversing the cutting tool T between any two selected adjacent vanes V of the workpiece W. If such oscillating movement is accomplished at a relatively high rate with respect to the other relative movement of the workpiece W and the rotating cutting tool T, it is apparent that the cutting tool T may be employed to not only generate the opposed surfaces of two adjacent vanes V but also to mill the interposed root surface R.

If the circumferential spacing between any two adjacent vanes of the impeller wheel W were uniform, then it would only be necessary to oscillate the lever 71 through a constant arc in order to effect the milling of the root contour of the workpiece. However, as is often the case, the circumferential spacing of two adjacent vanes V of the impeller workpiece W varies substantially from one axial end of the impeller to the other. It is accordingly necessary that a variable control of the extent of pivotal oscillation of the primary lever 71 be provided so that the arcuate extent of oscillation of the impeller wheel workpiece W with respect to the cutting tool T may be continuously varied to conform to the varying circumferential spacing between the two adjacent vanes.

In accordance with this invention, such automatic control is produced through a walking beam lever 76 which has one end thereof pivotally mounted by a bolt 77a to a suitable supporting block 77 carried by the first carriage 12. An arcuate groove 76a is formed in the walking beam lever 76 having a radius of curvature substantially equal to the radial displacement of the walking beam lever from the axis of primary spindle 13. A slide block 78 is mounted in the arcuate groove 76a and a link 79 is pivotally connected thereto by a pin 79a. The other end of link 79 is corotatably secured to the pin 73 to which the primary lever 71 is secured. Hence, in effect, a bell crank lever connection is provided between the walking beam 76 and the radially movable slide block 75.

The free end of the walking beam lever 76 is pivotally connected to an eccentric 81 through a connecting link 80. Eccentric 81 is secured to the output shaft 82a of the gear reduction unit 82 which in turn is driven by a motor 83. Both motor 83 and gear reduction unit 82 may be conveniently mounted on a frame structure 90 secured to the top of the first carriage 12 of the machine.

Eccentric 81 embodies means for conveniently adjusting the throw of the eccentric for initial set up purposes and comprises a generally cylindrical member having a disk-shaped head portion 81a and a centrally apertured stem portion 81b which is mounted on the shaft 82a and secured thereto by a set screw 84. A diametrically extending dove-tailed groove 81c is formed in the axial end face of the head portion 81a and the squared head 85a of a bolt-like element 85 is snugly slidably received in the dove-tailed groove. The shank portion 85b of the bolt-like element 85 functions as a crank shaft and has the connecting link 80 journaled thereon. A nut 86 retains the link 80 in axial assemblage on the bolt-like element 85.

The eccentricity of the bolt-like element 85 is controlled by a pair of adjusting screws 89 respectively projecting into the dove-tailed slot 81c from opposite ends thereof. Adjusting screws 89 are respectively carried by a pair of angle brackets 88 which are secured to head portion 81a of eccentric 81 by bolts 91.

From the foregoing description, it is apparent that rotation of the eccentric unit 81 will produce a pivotal oscillation of the walking beam lever 76 and, accordingly, a pivotal oscillation of the primary lever 71. Furthermore, since the walking beam lever 76 does not follow the rotational movements of the primary spindle 13, any rotational movement of the primary spindle 13 with respect to the carriage 12 will result in a shifting of the slide block 78 in the arcuate groove 76a of the walking beam lever. Such shifting effectively changes the leverage arm of the walking beam lever with respect to primary lever 71 and hence varies the arcuate extent of the pivotal oscillation imparted to the primary lever 71. Since the primary spindle 13 rotates with respect to the carriage 12 to produce one of the required relative movements between the workpiece W and the rotating cutting tool T, it is apparent that the rotational shifting of the primary spindle 13 is an exact function of the axial position of the cutting element T with respect to the workpiece W. Hence, the control of the arcuate extent of pivotal oscillation of the primary lever 71 occurs as an exact function of the axial position of the cutting tool element T with respect to the workpiece W and accordingly, the relative oscillation of the workpiece W with respect to the cutting tool T may be controlled so that the cutting tool T will circumferentially oscillate across the full space between any two adjacent vanes V of the impeller wheel to mill out the entire root surface therebetween but will not impair the generated vane surfaces in any manner, irrespective of the fact that the circumferential spacing between the opposed vane surfaces may vary along the axial length of the impeller wheel workpiece.

From the foregoing description it is apparent that a machine constructed in accordance with this invention may be employed to simultaneously generate a required pair of opposed, complex vane surfaces of an impeller wheel and the required root contour therebetween, or alternatively, the machine will operate upon an impeller wheel workpiece blank upon which the vane surfaces have already been formed, to mill out the root contour of such vanes to the required configuration without in any manner marring or impairing the finished vane surfaces. This invention provides a machine of unusual flexibility and wide application inasmuch as it permits four relative movements of the workpiece with respect to the rotating cutter to be employed and, in addition, superimposes an oscillating movement of the workpiece about its own axis.

It will, of course, be understood that various details of construction or proceduce may be modified through a wide range without departing from the principles of this invention and it is, therefore, not the purpose to limit the patent granted hereon otherwise than necessitated by the scope of the appended claims.

We claim as our invention:

1. A machine for milling the trough between two adjacent complex vanes of an impeller wheel, comprising a primary rotatable spindle, an impeller supporting fixture journaled on said spindle, a lever pivotally mounted on said primary spindle having one portion slidably engaged with said fixture, whereby said fixture follows all movements of said spindle but is rotated relative to said spindle by pivotal movement of said lever, a rotating cutting element, means for relatively shifting said primary spindle and the axis of said rotating cutting element to move said rotating cutting element along a path parallel to the contour of one of the vanes of the impeller wheel, and means for pivotally oscillating said lever at a rapid rate with respect to the relative movement of said primary spindle and the cutting element axis, whereby said cutting element traverses all of the trough portion intermediate said adjacent vanes.

2. A machine for milling the trough portion between two adjacent complex vanes of an impeller wheel, comprising a primary rotatable spindle, an impeller supporting fixture concentrically journaled on said spindle, a lever pivotally mounted on said primary spindle on an axis generally parallel to the spindle axis, said fixture having a generally radial groove slidably receiving an end portion of said lever, whereby said fixture follows all movements of said spindle but is rotatable relative to said spindle by pivotal movement of said lever, a rotating cutting element, means for relatively shifting said primary spindle and the axis of said rotating cutting element to move said rotating cutting element along the root contour of one of the vanes of the impeller wheel, and means for pivotally oscillating said lever whereby said cutting element traverses all of the trough portion intermediate said adjacent vanes.

3. A machine for milling the trough between two adjacent complex vanes of an impeller wheel, comprising a primary rotatable spindle, an impeller supporting fixture journaled on said spindle, a lever pivotally mounted on said primary spindle on an axis parallel to said primary spindle axis, one portion of said lever having radially sliding engagement with said fixture, whereby said fixture follows the movements of said primary spindle but pivotal movements of said lever rotate said fixture independently of said spindle, a rotating cutter, means for relatively shifting the axis of said rotating cutter and said primary spindle to cause said cutter to generate the shape of said vanes and to pass between said adjacent vanes, an oscillating member having a fixed stroke, linkage means connecting said oscillating member to said lever to pivotally oscillate the same, said linkage means being constructed and arranged to vary the extent of oscillation of said lever as a function of the relative position of said primary spindle and the axis of said rotating cutter, whereby said rotating cutter traverses all of the space intermediate said adjacent vanes without contacting either of the opposed vane surfaces.

4. A machine for milling the trough between two adjacent complex vanes of an impeller wheel, comprising a primary rotatable spindle, an impeller supporting fixture concentrically journaled on said spindle, a rotating cutter, means for relatively shifting the axis of said cutter and said primary spindle to cause said rotating cutter to generate the shape of said vanes and to pass between said adjacent vanes, a lever pivotally mounted on said primary spindle on an axis parallel to said primary spindle axis, one portion of said lever having radially slidable engagement with said fixture, whereby said fixture follows the movements of said primary spindle but pivotal movements of said lever rotate said fixture independently of said spindle, a support adjacent said primary spindle, a fixed stroke oscillating member mounted on said support, and a walking beam connection between said oscillating member and said lever, whereby the extent of pivotal oscillation of said lever is varied as a function of the angular displacement of said primary spindle relative to said support, and said rotating cutter is caused to traverse all of the space between said adjacent vanes without contacting said vanes.

5. A machine for milling the trough between two adjacent complex vanes of an impeller wheel, comprising a primary rotatable spindle, an impeller supporting fixture concentrically journaled on said spindle, a rotating cutter, means for relatively shifting the axis of said cutter and said primary spindle to cause said cutter to generate the shape of said vanes and to pass between said adjacent vanes, a first lever pivotally mounted on said primary spindle on an axis parallel to said primary spindle axis, one portion of said first lever having radially slidable engagement with said fixture, whereby said fixture follows the movements of said primary spindle with respect to said rotating cutter but pivotal movements of said lever rotate said fixture independently of said spindle, a support adjacent said primary spindle, a second lever pivoted on said support on an axis parallel to said first lever axis, means for slidably connecting said first lever to said second lever, whereby the effective leverage arm of said second lever is variable as a function of the angular position of said primary spindle relative to said support, and means for pivotally oscillating said second lever, thereby oscillating said primary spindle relative to said rotating cutter to cause said rotating cutter to traverse all of the space between opposed vanes without contacting said vanes.

6. The combination defined in claim 5 wherein said last mentioned means comprises a motor driven rotating eccentric operatively connected to said second lever to pivotally oscillate said second lever about its said pivotal axis.

7. In a machine for making impeller wheels or the like, such machine having mixture means for supporting an impeller wheel workpiece, a rotating cutting element, and means for producing relative movement between said fixture means and said cutting element to pass said cutting element between two adjacent vanes of the impeller wheel along a path generating a surface parallel to said vane surfaces, the improvements comprising a motor driven eccentric, linkage means connecting said eccentric to said fixture means to superimpose an oscillating relative movement between said cutting element and said fixture means, said linkage means including means for varying the arcuate extent of said oscillating relative movement as a function of the angular position of said fixture means, thereby oscillatably traversing said cutting element circumferentially between said adjacent vanes.

8. A machine for milling the trough between two adjacent complex vanes for an impeller wheel, comprising a primary rotatable spindle, a fixture support concentrically journaled on said primary spindle, a workpiece fixture concentrically journaled on said fixture support and adapted to concentrically mount an impeller wheel workpiece, means for indexably securing said fixture to said fixture support to position the impeller wheel workpiece in any one of a plurality of angularly spaced positions, a lever pivotally mounted on said primary spindle having one portion slidably engaged with said fixture support, whereby said fixture support follows all movements of said primary spindle but is rotatable relative to said primary spindle by pivotal movements of said lever, a rotating cutting element, means for relatively shifting said primary spindle and the axis of said rotating cutting element to move said rotating cutting element along the root contour of one of the vanes of the impeller wheel, and means for pivotally oscillating said lever, whereby said cutting element traverses all of the trough portion intermediate any two selected adjacent vanes as determined by the indexed position of said fixture relative to said fixture support.

9. The method of machining a trough portion between two adjacent projections radiating from the base of a workpiece which comprises projecting a cutting tool between the projections, rotating said cutting tool about its own axis, relatively shifting the workpiece and the cutter in the direction of the cutter axis to vary the radial depth of the trough along the axial length of the trough, relatively shifting the workpiece and the cutter a plurality of times in a lateral direction relative to the cutter axis for controlling the circumferential width of the trough, and simultaneously with the relative shifting of the workpiece and cutter in the direction of the cutter axis shifting said workpiece and cutter along a controlled axial path between the projections.

10. The method of machining the hub portion of an impeller wheel lying intermediate two adjacent vanes radiating from the hub which comprises projecting a cutting tool radially between said two vanes, rotating said cutting tool about its own axis, shifting the cutting tool along its own axis to control the radial dimension of the hub, simultaneously shifting the wheel relative to the cutting tool for controlling the axial shape of the hub portion between said vanes, and concurrently oscillating the wheel a plurality of times relative to the cutting tool axis in a direction transverse to said shifting movement of the wheel for machining all of the hub portion lying intermediate said vanes.

11. Apparatus adapted for milling the hub portion of an impeller wheel lying between two adjacent vanes radiating from the hub which comprises a work support for the wheel, a cutter support for holding a cutter tool to project into the space between two adjacent vanes of the work piece, means for rotating about its own axis a cutter tool carried by said support, first means for relatively shifting the cutter support and work support to control the radial cutting path along the hub, second means for relatively shifting the cutter support and work support to control the axial cutting path along the hub, and third means for relatively oscillating the cutter support and the work support a plurality of times to control the peripheral cutting path along the hub.

HOWARD R. DE VLIEG.
PIERCE T. ANGELL.

REFERENCES CITED

The following references are of record in the file of this patent:

UNITED STATES PATENTS

| Number | Name | Date |
|---|---|---|
| 1,406,866 | Horn | Feb. 14, 1922 |
| 1,609,045 | Witherow | Nov. 30, 1926 |
| 1,775,184 | Abbott | Sept. 9, 1930 |
| 1,881,652 | Justice | Oct. 11, 1932 |
| 2,269,200 | Hillner | Jan. 6, 1942 |
| 2,429,324 | Meisser | Oct. 21, 1947 |
| 2,449,179 | Scharping | Sept. 14, 1948 |
| 2,480,807 | De Vlieg | Aug. 30, 1949 |